United States Patent [19]
Lin et al.

[11] Patent Number: 6,055,558
[45] Date of Patent: Apr. 25, 2000

[54] PACING OF MULTIPLE PRODUCERS WHEN INFORMATION IS REQUIRED IN NATURAL ORDER

[75] Inventors: Fen-Ling Lin, San Jose; Bryan F. Smith, Morgan Hill; Yun Wang, Saratoga, all of Calif.

[73] Assignee: International Business Machines Corporation, Armonk, N.Y.

[21] Appl. No.: 08/653,908

[22] Filed: May 28, 1996

[51] Int. Cl.[7] ............................................. G06F 1/00
[52] U.S. Cl. ........................ 709/100; 709/104; 709/106; 712/1; 712/9
[58] Field of Search .................... 395/676, 650; 709/104, 100, 106; 712/1, 9

[56] References Cited

U.S. PATENT DOCUMENTS 3,805,244  4/1974  Tooka ................................ 340/172.5
5,471,593  11/1995  Branigin .............................. 395/375

Primary Examiner—Lucien U. Toplu
Assistant Examiner—Yveste G Cherubin
Attorney, Agent, or Firm—Sterne, Kessler, Goldstein & Fox P.L.L.C.

[57] ABSTRACT

A system and method for pacing, or controlling, the processing of multiple producers when a consumer requires results from the producers in natural order. This invention regulates the use of system resources between the producers to ensure that the required results are available to the consumer in natural order with minimal waiting and to prevent unneeded advanced processing by the producers. This invention implements a buffer structure such that each producer writes its results to an associated buffer. Each producer compares its buffer's percentage complete against a next and previous producer's buffer. If a producer produces results too rapidly, the producer suspends itself until it is resumed by the consumer or the previous producer. The consumer reads the results from the buffers in producer order.

24 Claims, 9 Drawing Sheets

CONSUMER-PRODUCER STRUCTURE

CHECK NEXT PRODUCER

CHECK PREVIOUS PRODUCER

PACING OF MULTIPLE PRODUCERS WHEN INFORMATION IS REQUIRED IN NATURAL ORDER

BACKGROUND OF THE INVENTION

1. Technical Field

This invention relates generally to multi-tasking, and more specifically to a consumer task requiring results from one or more producer tasks in natural order.

2. Background Art

One important feature of a central processor complex (CPC), a computer system comprising one or more processors, is the ability of the CPC to exploit all resources within the complex. For example, an application executing in the CPC may spawn multiple parallel tasks (multi-tasking) in order to achieve concurrent processing of a specific job, thereby reducing the overall processing time required to complete the job.

In a typical multi-tasking scenario, the processing of a job is divided among a plurality of producer tasks, producers. In addition, a consumer task, consumer, is directed to receive the results from the producers and return the results to the requesting application. The consumer may require the results from the producers in either natural or non-natural order.

Natural order requires the producers to return the results of a job to the consumer in the order of producers. Producer order refers to the numerical order in which the producers were assigned their jobs. For example, if the processing of a database query is divided among four (4) producers (P-1, P-2, P-3, and P-4), the producer order is as follows: P-1 is the first producer, P-2 is the second producer, P-3 is the third producer, and P-4 is the fourth producer. Therefore, the consumer must first receive all of resulting data rows from P-1, followed by all of the resulting data rows from P-2, P-3, and P-4 respectively.

In contrast, when a consumer requires non-natural order, the consumer receives the job results from the producers as the results become available. Therefore, referring again to the above example, the consumer does not wait for P-1 to complete its results before retrieving results from the remaining producers. The consumer may retrieve data rows from any of the producers as the data rows become available.

In contemporary CPCs, a problem arises when a job is divided among multiple producers and requires the results from the producers in natural order. The consumer does not prioritize the producers, thereby resulting in the producers vying equally for system resources such that the completion order of the producers is indeterminable. The consumer simply must wait for the first producer to complete its portion of the job before retrieving and processing its results.

Therefore, by requiring results in natural order, the consumer may incur a waiting period during which the consumer is waiting for the first producer to complete its job. This waiting period is extended when a second producer is allocated system resources at a higher level than the first producer. The second producer may complete its portion of the job prior to the first producer. In such a case, system resources (both input/output and processor resources) are taken away from the first producer and unnecessarily allocated to the second producer, thereby resulting in unneeded advanced producing by the second producer.

Therefore, there is a need for a pacing mechanism by which a consumer, requiring results in natural order, can regulate the processing of a plurality of producers. A pacing mechanism minimizes a consumer's waiting period for results and prevents the unneeded advanced producing of the producers by the misallocation of system resources.

DISCLOSURE OF INVENTION

The present invention for the pacing of multiple producers when information is required in natural order solves the current problem of unneeded advanced processing and increased waiting periods by regulating the use of system resources. The present invention paces, or controls, the processing of the producers by assigning each producer a dedicated buffer and having each producer repeatedly check the completion status of each of its neighboring producers.

The present invention allocates multiple buffers, or blocks of memory, in which the producers write their results. There is one buffer allocated for each producer. Therefore, as a producer processes its assigned job, the producer writes its results into its associated buffer. In order to retrieve the results in natural order, the consumer retrieves the results from the first producer's buffer, followed by retrieving the results from the remaining producers' buffers in producer order.

The present invention ensures that the producers complete their assigned jobs and write their results to the buffer in producer order by having each producer analyze its completion status against its neighboring producers. More specifically, as a producer sends results to its buffer, it makes two pacing checks. First, the producer compares the next producer's results against a floor threshold percentage of its produced results. If the next producer drops below the floor threshold, the producer resumes the next producer if it was suspended. This first pacing check ensures that the next producer does not fall too far behind the producer in producing results.

The second pacing check compares the producer's results against a ceiling threshold percentage of the previous producer's results. If the producer produces more results than the ceiling threshold of the previous producer, the producer suspends itself, thereby freeing up system resources for the previous producer. Because the consumer requires the results in producer order, this second check ensures that the previous producer will complete before the current producer. This second pacing check ensures that the producer does not perform unneeded advanced processing and take away system resources from the previous producer.

In the case where a producer fills its associated buffer, but still has more data to produce, the producer writes its results from its buffer to auxiliary storage. Auxiliary storage is an external file in memory into which the producer writes results while its buffer is full. The producer continues to write results to the auxiliary storage until the producer's buffer becomes the returning buffer. A returning buffer is a buffer from which a consumer is currently retrieving results. The producer indicates to the consumer whether to retrieve results from the buffer or auxiliary storage.

Additional features of this invention will become apparent from the following detailed description of the best mode for carrying out the invention and from the appended claims.

BRIEF DESCRIPTION OF DRAWINGS

The present invention is described with reference to the accompanying drawings. In the drawings, like reference numbers indicate identical or functionally similar elements. Additionally, the left-most digit(s) of a reference number identifies the drawing in which the reference number first appears.

BEST MODE FOR CARRYING OUT THE INVENTION

1. System Architecture

The best mode of the present invention is directed to a single-CPC system, coupled to multiple direct access storage devices (DASDs). It should be understood, however, that the invention is not limited to this embodiment. Instead, the invention as described herein is applicable and intended to operate with a single-CPC. A CPC is a logical computer system including one or more processors. The preferred embodiment of a CPC of the present invention is one that can function in a single-CPC or multi-CPC environment. Examples of a CPC used in the present invention are: System 390 Parallel Transaction Server model 9672, System 390 9021 711-Based Water-Cooled models, and System 390 9021 511-Based Air-Cooled Frame Mounted models. These CPCs are available from International Business Machines Corporation (IBM) and described in the IBM document S/390 *Parallel Reference Guide,* G326-0416, which is incorporated herein by reference in its entirety. It should be understood that the invention is described with reference to these CPCs for convenience purpose only. Other CPCs could alternatively be used.

Figure 1:
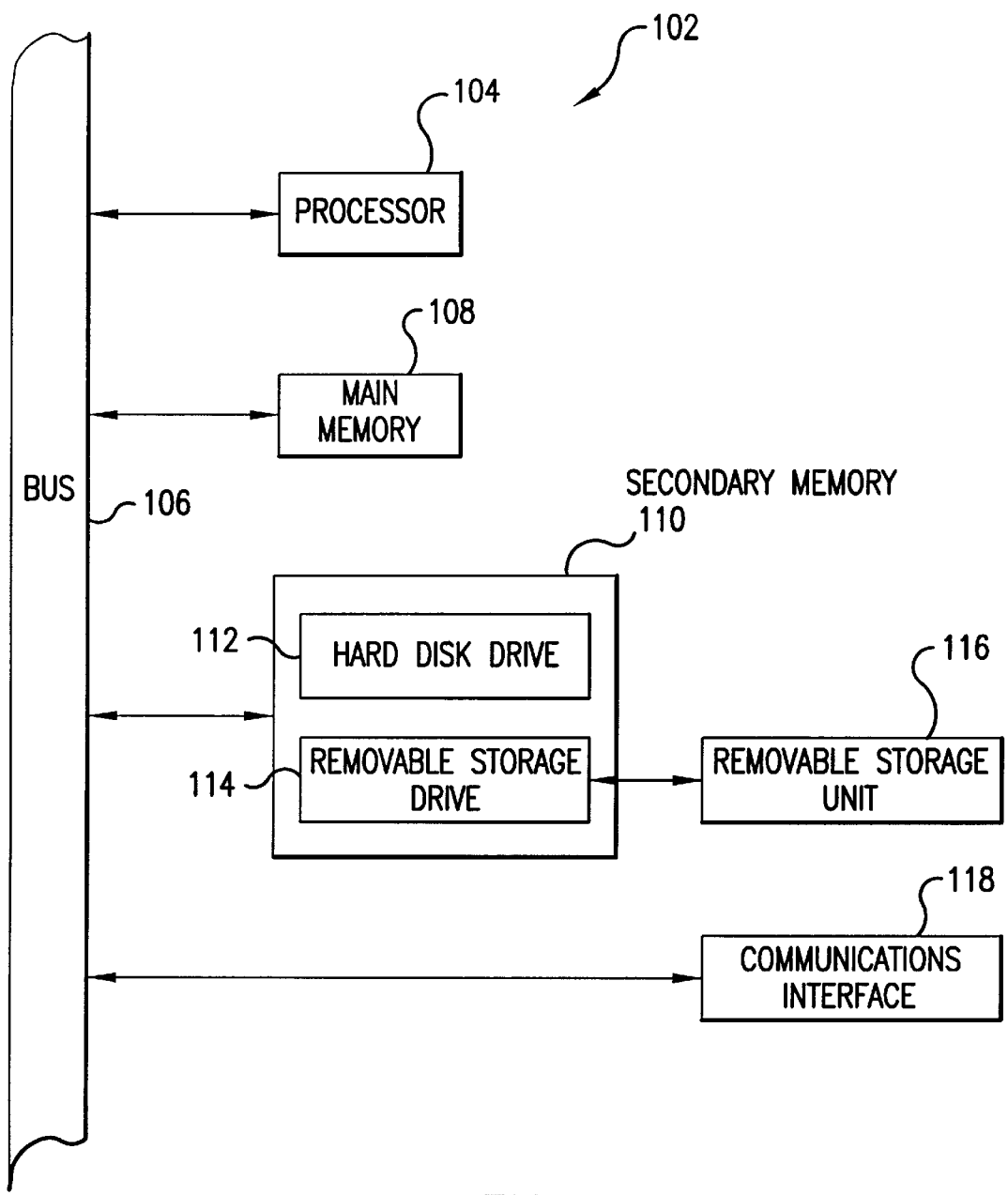
FIG. 1 is a block diagram of an exemplary CPC.

An exemplary CPC is shown in FIG. 1. The CPC 102 includes one or more processors, such as processor 104. The processor 104 is connected to a communication bus 106.

The CPC 102 also includes a main memory 108, preferably random access memory (RAM), and a secondary memory 110. The secondary memory 110 includes, for example, a hard disk drive 112 and/or a removable storage drive 114, representing a floppy disk drive, a magnetic tape drive, a compact disk drive, a program cartridge and cartridge interface (such as that found in video game devices), a removable memory chip (such as EPROM, or PROM), etc. which is read by and written to by a removable storage unit 116. Removable storage unit 116, also called a program storage device or a computer program product, represents a floppy disk, magnetic tape, compact disk, etc. As will be appreciated, the removable storage unit 116 includes a computer usable storage medium having stored therein computer software and/or data. The removable storage drive 114 reads from and/or writes to a removable storage unit 116 in a well known manner.

The CPC 102 may also include other similar means for allowing computer programs or other instructions to be loaded. Such means can include, for example, a communications interface 118. Communications interface 118 allows software and data to be transferred between computer system 102 and external devices. Examples of communications interface 118 can include a modem, a network interface (such as an Ethernet card), a communications port, etc. Software and data transferred via communications interface 118 are in the form of signals which can be electronic, electromagnetic, optical or other signals capable of being received by communications interface 118.

In this document, the term "computer program product" is used to generally refer to removable storage unit 116, a hard disk installed in hard disk drive 112, and signals transferred via communications interface 118. These computer program products are means for providing software to a computer system 102.

In an embodiment where the invention is implemented using software, the software may be stored in main memory 108, or in a computer program product and loaded into computer system 102 using removable storage drive 114, hard disk drive 112, or communications interface 118. The software, when executed by the processor 104, causes the processor 104 to perform the functions of the invention described herein.

In another embodiment, the invention is implemented primarily in hardware using, for example, a hardware state machine. Implementation of the hardware state machine so as to perform the functions described herein will be apparent to persons skilled in the relevant arts.

Preferably, the database management system DB2, version 4 for MVS/ESA executes on the preferred CPC. Multiple Virtual Storage/Enterprise System Architecture (MVS/ESA) is the preferred operating system for the IBM System 390 architecture. DB2 for MVS/ESA is currently available from IBM and pertinent aspects of DB2 are described in many publicly available documents, such as *IBM Database 2 Version 4: What's New in DB2?,* GC26-8206, 1994, which is incorporated herein by reference in its entirety. It should be understood that the invention is described with reference to DB2 for convenience purpose only. Other DBMSs could alternatively be used.

2. Overview of the best mode

The best mode for the present invention comprises a DBMS executing on a single-CPC coupled to multiple DASDs. Through query parallelism, the DBMS divides the processing of an application's query into multiple parallel tasks, including a consumer and a plurality of producers. Query parallelism is well known in the relevant art and is not part of the present invention. It should also be understood that the invention is described with reference to query parallelism for convenience purpose only. Other applications of the present invention could alternatively be used.

Figure 2:
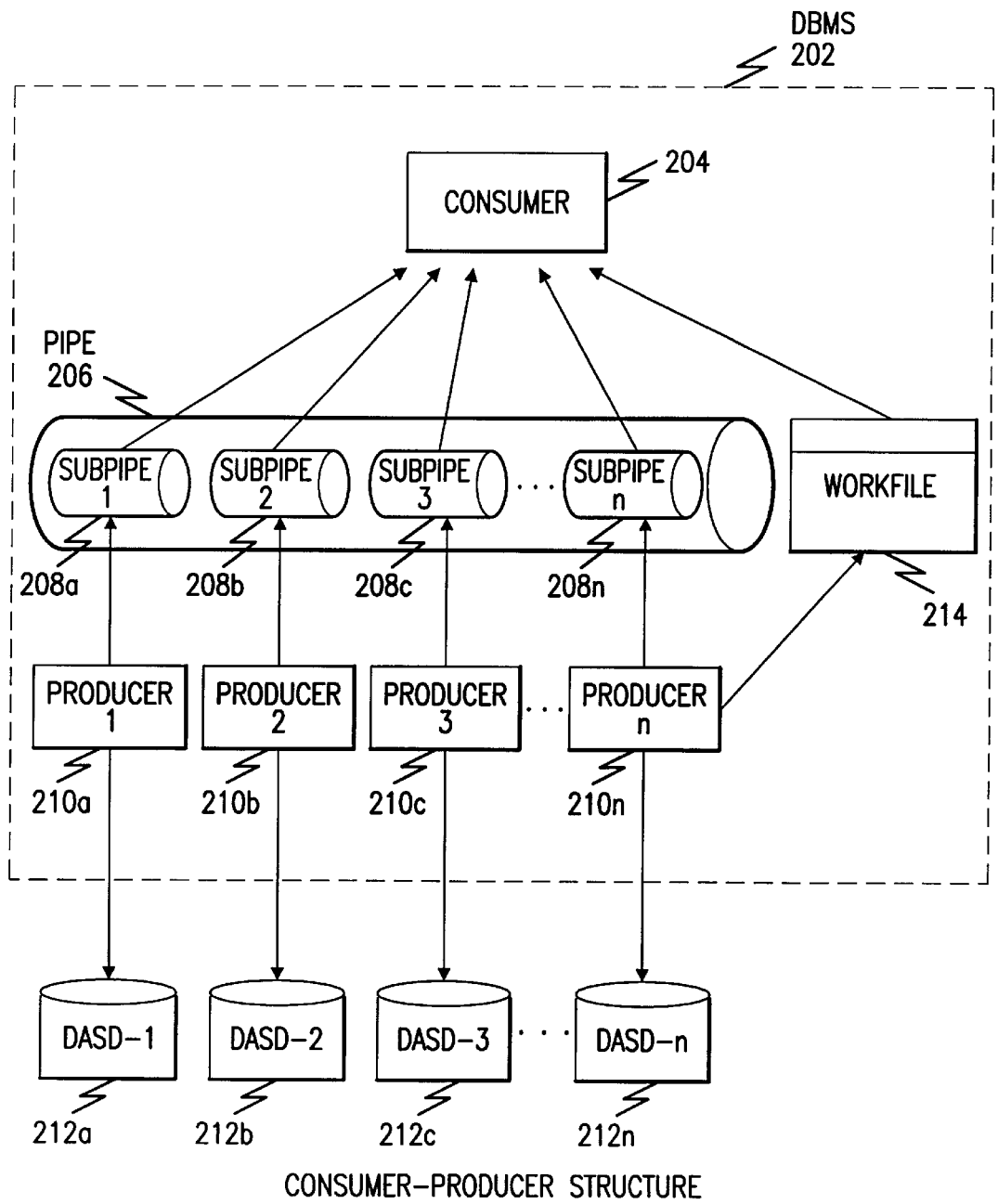
FIG. 2 is a block diagram of a consumer and a plurality of producers.

FIG. 2 is a block diagram illustrating the relationship between a consumer 204 and a plurality of producers 210a–210n. In the best mode, a DBMS 202, executing on a CPC 102, receives a large, data intensive query. The DBMS 202 creates a plurality of producers 210a–210n among which the query is divided and processed, and a consumer 204 for receiving the results from the producers 210a–210n in natural order. The producers 210a–210n access the data on the DASDs 212a–212n during execution.

The consumer 204 allocates a pipe 206 in memory for receiving the results from the producers 210a–210n. More specifically, the pipe 206 is a block of memory representing a buffer area. The pipe 206 is partitioned into a plurality of sub-pipes 208a–208n such that each producer 210a–210n writes its results to an associated sub-pipe 208a–208n. In the chosen embodiment of the present invention, each sub-pipe 208a–208n has a size of 32K bytes. It would be readily apparent, however, to a person of ordinary skill in the relevant art to use a sub-pipe 208a–208n of a different size.

When receiving the results in natural order, the consumer 204 first retrieves the results from sub-pipe 1 208a, produced by producer 1 210a. Subsequently, the consumer 204 retrieves the results from sub-pipe 2 208b, sub-pipe 3 208c, and sub-pipe n 208n respectively.

In the case where a producer 210a–210n fills its associated sub-pipe 208a–208n, but still has more data to produce, the producer 210a–210n writes its results from the sub-pipe 208a–208n to a workfile 214. The workfile 214 represents auxiliary storage for the producer 210a–210n. For example, assume that producer n 210n fills its sub-pipe 208n with results. At that point, producer n 210n creates a workfile 214 and copies the contents of its sub-pipe 208n to the workfile 214. Producer n 210n also indicates in a control block located in its sub-pipe 208n that the results are being output to the workfile 214. Therefore, the consumer 204 knows to retrieve producer n's 210n results from the workfile 214 and not its sub-pipe 208n. Producer n 210n continues to write its results to the workfile 214 until it finishes producing results or its sub-pipe 208n becomes the returning sub-pipe.

Figure 3:
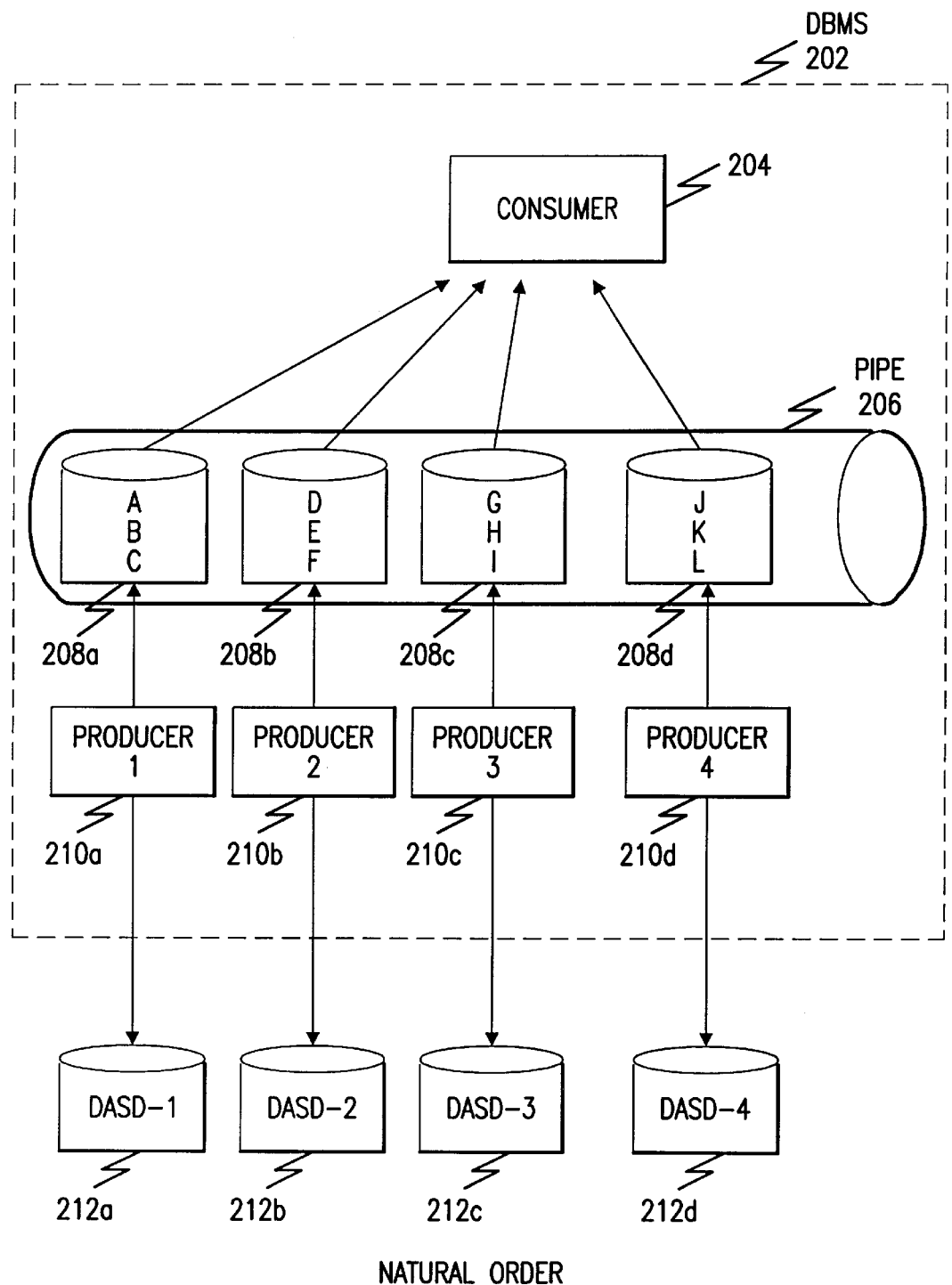
FIG. 3 is a block diagram illustrating natural ordering between a consumer and a plurality of producers.

FIG. 3 is a block diagram illustrating natural ordering between a consumer and a plurality of producers. In this example, producer 1 210a produced results "A, B, and C" and stored the results in sub-pipe 1 208a; producer 2 210b produced results "D, E, and F" and stored the results in sub-pipe 2 208b; producer 3 210c produced results "G, H, I" and stored the results in sub-pipe 3 208c; and producer 4 210d produced results "J, K, and L" and stored the results in sub-pipe 4 20dn. As discussed above, for the consumer 204 to retrieve the results in natural order, the consumer 204 must retrieve the results from the sub-pipes 208a–208n in producer order. In this case, producer order is producer 1 210a, producer 2 210b, producer 3 210c, producer 4 210d, respectively. Therefore, the consumer 204 would retrieve the following final results from the sub-pipes 208a–208d: "A, B, C, D, E, F, G, H, I, J, and K."

Figure 4:
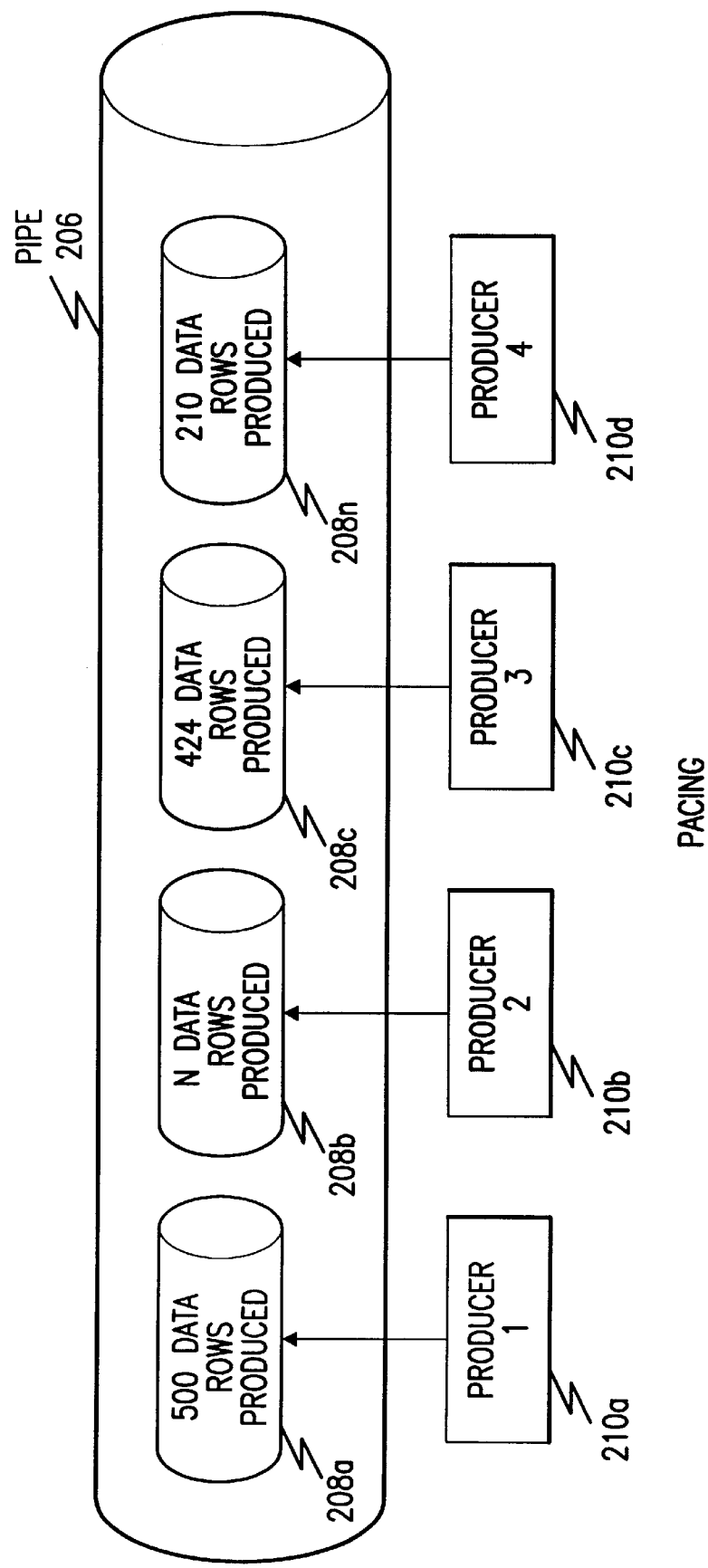
FIG. 4 is a block diagram illustrating the pacing mechanism of the present invention.

FIG. 4 is a block diagram illustrating the pacing mechanism of the present invention. In this example, producer 1 210a has produced and stored 500 data rows in sub-pipe 1 208a; producer 2 210b has produced and stored a variable number N of data rows in sub-pipe 2 208b; producer 3 210c has produced and stored 424 data rows in sub-pipe 3 208c; and producer 4 210d has produced and stored 210 data rows in sub-pipe 4 208d.

The pacing mechanism directs each producer 210a–210d to make two pacing checks on the sub-pipes 208a–208d associated with its neighboring producers 210a–210d. More specifically, as a producer sends results to its sub-pipe, it makes two pacing checks: (1) if the next producer (the subsequent producer in producer order) has produced less than a floor threshold percentage of the produced results of the producer, then the producer resumes the next producer if it was suspended; and (2) if the producer has produced greater than a ceiling threshold percentage of the results produced by the previous producer (the producer preceding the producer in producer order), then the producer suspends itself. Furthermore, the first pacing check is not performed by the last producer, and the second pacing check is not performed by the first producer.

Referring again to FIG. 4, the two pacing checks of the present invention are described below for various values of N, where N represents the number of data rows produced by producer 2 210b and written to sub-pipe 2 208b. In addition, the best mode of the present invention establishes the floor threshold at fifty (50) percent, and the ceiling threshold at seventy-five (75) percent. However, other threshold values of the present invention could alternatively be used. It would be readily apparent to a person skilled in the relevant art to establish different threshold values based on system performance and optimization parameters.

In a first example, assume that producer 2 210b produced 851 (N=851) data rows at the time it made the two pacing checks. The first pacing check results in the next producer, producer 3 208c, being resumed if it was suspended because (424<(50% of 851)); that is 424<425.5. The second pacing check results in producer 2 210b suspending itself because (841>(75% of 500)); that is 841>375.

In a second example, assume that producer 2 210b produced 320 (N=320) data rows at the time it made the two pacing checks. For this example, the symbol "/<" means "not less than," and the symbol "/>" means "not greater than." The first pacing check results in the next producer, producer 3 208c, not being resumed because (424/<(50% of 320)); that is 424/<160. The second pacing check results in producer 2 210b not suspending itself because (320/>(75% of 500)); that is 320/>325.

3. Control flow for a Consumer

Figure 5:
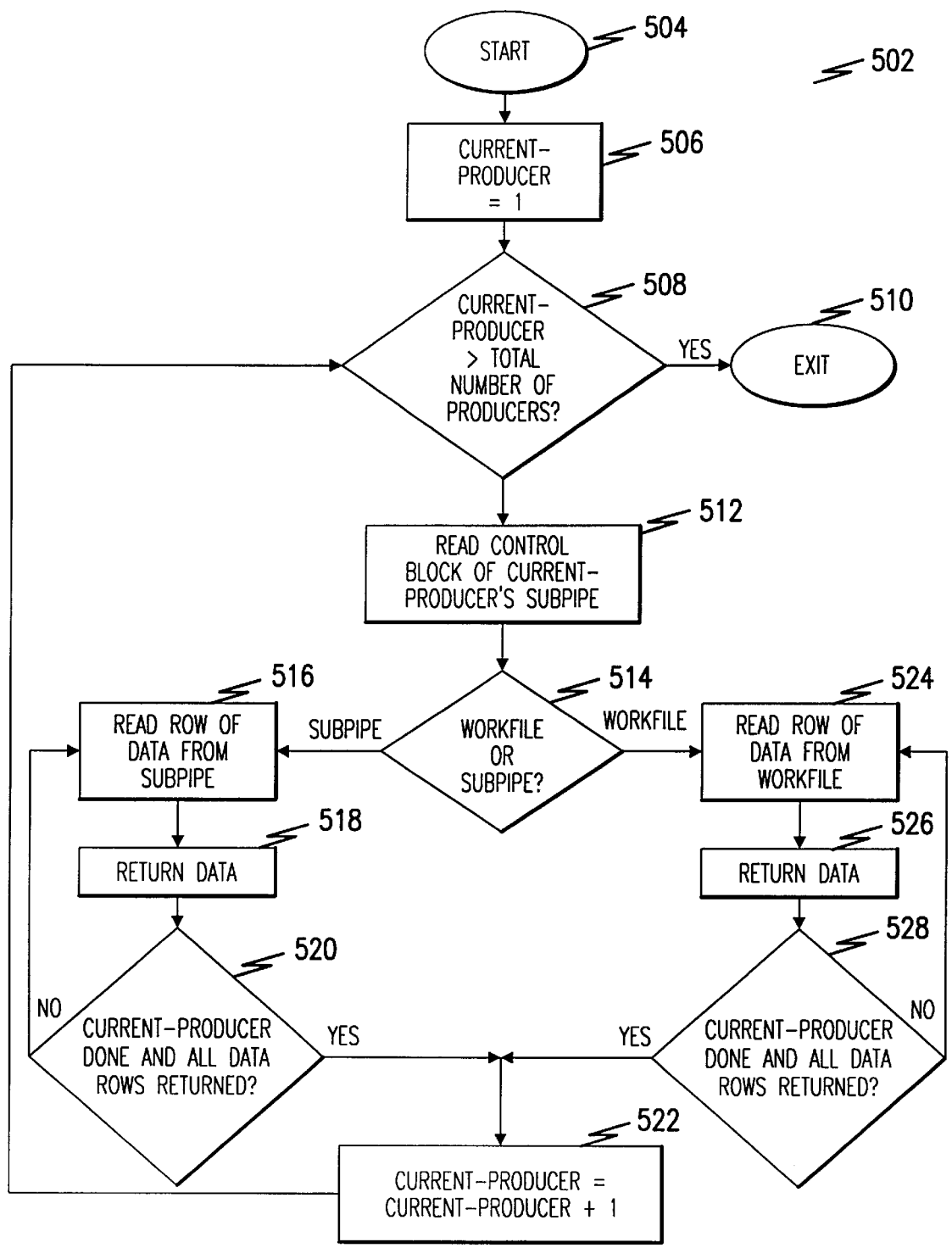
FIG. 5 is a control flow diagram representing the operation of a consumer.

The control flow of a consumer 204 in the present invention is illustrated in FIG. 5. As described above, a consumer 204 retrieves the results from a plurality of producers 210a–210n in natural order. In step 506, the consumer 204 initializes the variable current-producer to the value '1.' The current-producer variable identifies a specific producer 210a–210n and is used for looping through the producers 210a–210n in producer order, beginning with the first producer 210a. Continuing to step 508, the consumer 204 enters the loop for looping through the producers 210a–210n.

It should be understood, however, that the invention is not limited to this embodiment of using a current-producer variable to loop through the producers 210a–210n. Instead, the invention is described in these terms for convenience purposes only. Other mechanisms for looping through the producers 210a–210n could alternatively be used. For example, a consumer 204 could traverse a linked list in which each node of the linked list points to a producer 210a–210n. It would be readily apparent to a person skilled in the relevant art to implement an alternative mechanism.

In step 508, the consumer 204 determines whether it has traversed through the entire list of producers 210a–210n. If there are no more producers 210a–210n from which the consumer 204 needs to retrieve results, then the consumer 204 proceeds to step 510 and exits. If the current-producer is a producer 210a–210n from which the consumer 204 needs to retrieve results, the consumer 204 enters the loop and proceeds to step 512.

In step 512, the consumer 204 reads the control block of the sub-pipe 208a–208n associated with the current-producer. The control block contains flags indicating whether the current-producer has completed producing all of its data rows and whether the current producer is writing to its sub-pipe 208a–208n or to a workfile. Continuing to step 514, the consumer 204 analyzes the control block and determines whether the current-producer is currently writing its results to its associated sub-pipe 208a–208n or to a workfile. If the current-producer is currently writing to its sub-pipe 208a–208n, the consumer 204 proceeds to step 516 and enters a loop to read the contents of the current-producer's sub-pipe 208a–208n.

In step 516, the consumer 204 reads a row of data from the current-producer's sub-pipe 208a–208n. Proceeding to step 518, the consumer 204 returns the row of data to the application that initiated the database query and proceeds to step 520. In step 520, the consumer 204 determines whether (1) the current-producer has completed its results, and (2) all of the data rows in the sub-pipe 208a–208n have been returned to the application. If the consumer 204 determines that the condition of step 520 has not been satisfied, the consumer 204 returns to step 516 to continue reading the results from the current-producer's sub-pipe 208a–208n.

If, however, the consumer 204 determines in step 520 that the condition is satisfied, the consumer 204 proceeds to step 522. In this case, the consumer 204 knows that the current-producer has produced all of its results and that the consumer 204 has read and returned those results. Therefore, the consumer 204 proceeds to step 522 in which the consumer 204 increments the current-producer counter to specify the next producer. The consumer 204 then returns to step 508 to read the results from the next producer.

Referring again to step 514, if the current-producer is currently writing to a workfile 214, the consumer 204 proceeds to step 524. In step 524, the consumer 204 reads a row of data from the current-producer's workfile 214. Proceeding to step 526, the consumer 204 returns the row of data to the application that initiated the database query and proceeds to step 528. In step 528, the consumer 204 determines whether (1) the current-producer has completed its results, and (2) all of the data rows in the workfile 214 have been returned to the application. If the consumer 204 determines that the condition of step 528 has not been satisfied, the consumer 204 returns to step 524 to continue reading the results from the current-producer's workfile 214.

If, however, the consumer 204 determines in step 528 that the condition is satisfied, the consumer 204 proceeds to step 522. In this case, the consumer 204 knows that the current-producer has produced all of its results and that the consumer 204 has read and returned those results. Therefore, the consumer 204 proceeds to step 522 in which the consumer 204 increments the current-producer counter to specify the next producer. The consumer 204 then returns to step 508 to read the results from the next producer.

In practice, a more complicated implementation occurs when the consumer 204 does not read the data rows directly from the current-producer's workfile 214. In this case, a producer 210a–210n is writing to a workfile 214 when it becomes the current-producer, or the returning sub-pipe. The current-producer immediately suspends itself to allow the consumer 204 time to consume the produced data rows in the workfile 214. Because the consumer 204 will not read the data rows directly from the workfile 214, the consumer 204 copies a block of data rows from the current-producer's workfile 214 to the current-producer's sub-pipe 208a–208n. The block size is equal to the maximum size of a sub-pipe 208a–208n which in the chosen embodiment of the present invention is 32K bytes.

The consumer 204 then reads the data rows from the current-producer's sub-pipe 208a–208n until all of the data rows have been consumed. Once the consumer 204 consumes all of the data rows in the sub-pipe 208a–208n, the consumer 204 copies the next block of data rows from the current-producer's workfile 214 to the current-producer's sub-pipe 208a–208n.

The consumer 204 continues this procedure of copying blocks of data rows until it has consumed all of the data rows in the workfile 214. Once the workfile 214 has been consumed, the consumer 204 resumes the suspended current-producer. The current-producer then produces the remaining data rows and writes them directly to its sub-pipe 208a–208n. The consumer 204 will consume the data rows directly from the sub-pipe 208a–208n as the current-producer 210a–210n produces them.

At this point of the process, if the current-producer fills its associated sub-pipe 208a–208n, the current-producer suspends itself and does not spill over to a workfile 214. This allows the consumer 204 time to consume the contents of the sub-pipe 208a–208n. After consuming the data rows of the sub-pipe 208a–208n, the consumer 204 resumes the current-producer. Then, the current-producer and consumer 204 continue their processing as described above.

4. Control flow for a Producer

Figure 6:
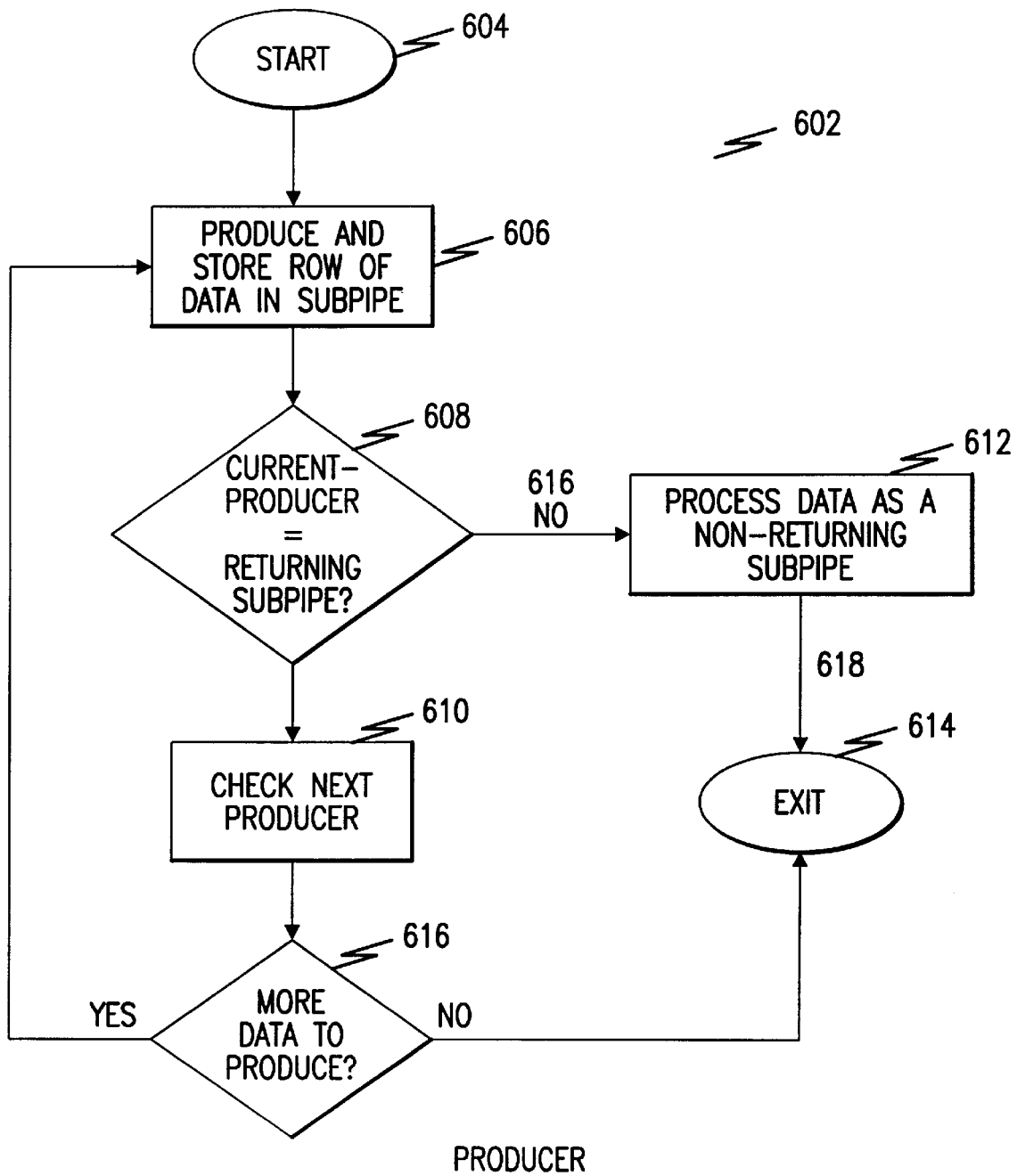
FIG. 6 is a control flow diagram representing the operation of a producer.

The control flow of a producer 210a–210n in the present invention is illustrated in FIG. 6. As described above, a producer 210a–210n produces results for a consumer 204 in natural order. In step 606, the producer 210a–210n produces a data row and stores the data in its sub-pipe 208a–208n. Continuing to step 608, the producer 210a–210n determines whether it is a returning sub-pipe (the current-producer); that is, whether the producer 210a–210n is associated with the sub-pipe 208a–208n that is currently being consumed by the consumer 204. If the producer 210a–210n determines that it is the returning sub-pipe, the producer 210a–210n proceeds to step 610.

In step 610, the producer 210a–210n makes a pacing check on its next producer 210a–210n. Step 610 is described in greater detail below. Continuing from step 610, the producer 210a–210n proceeds to step 616. In step 616, the producer 210a–210n determines whether it has any more data rows to produce. If there is more data to produce, the producer 210a–210n returns to step 606 to produce and store another row of data. If there is no more data to produce, the producer 210a–210n proceeds to step 614 and exits.

In practice, a more complicated implementation occurs when the producer 210a–210n is already the returning sub-pipe (or the current-producer) when it fills its associated sub-pipe 208a–208n. As the returning sub-pipe, the current-producer never spills over to a workfile 214, but rather, immediately suspends itself and allows the consumer 204 time to consume all of the data rows in its sub-pipe 208a–208n. The current-producer makes this check to suspend itself after step 608 and before step 610. When the consumer 204 consumes all of the data rows in the sub-pipe 208a–208n, the consumer 204 resumes the current-producer. Then, the current-producer continues to write data rows to its sub-pipe 208a–208n as the consumer 204 continues to consume the data rows.

Figure 7:
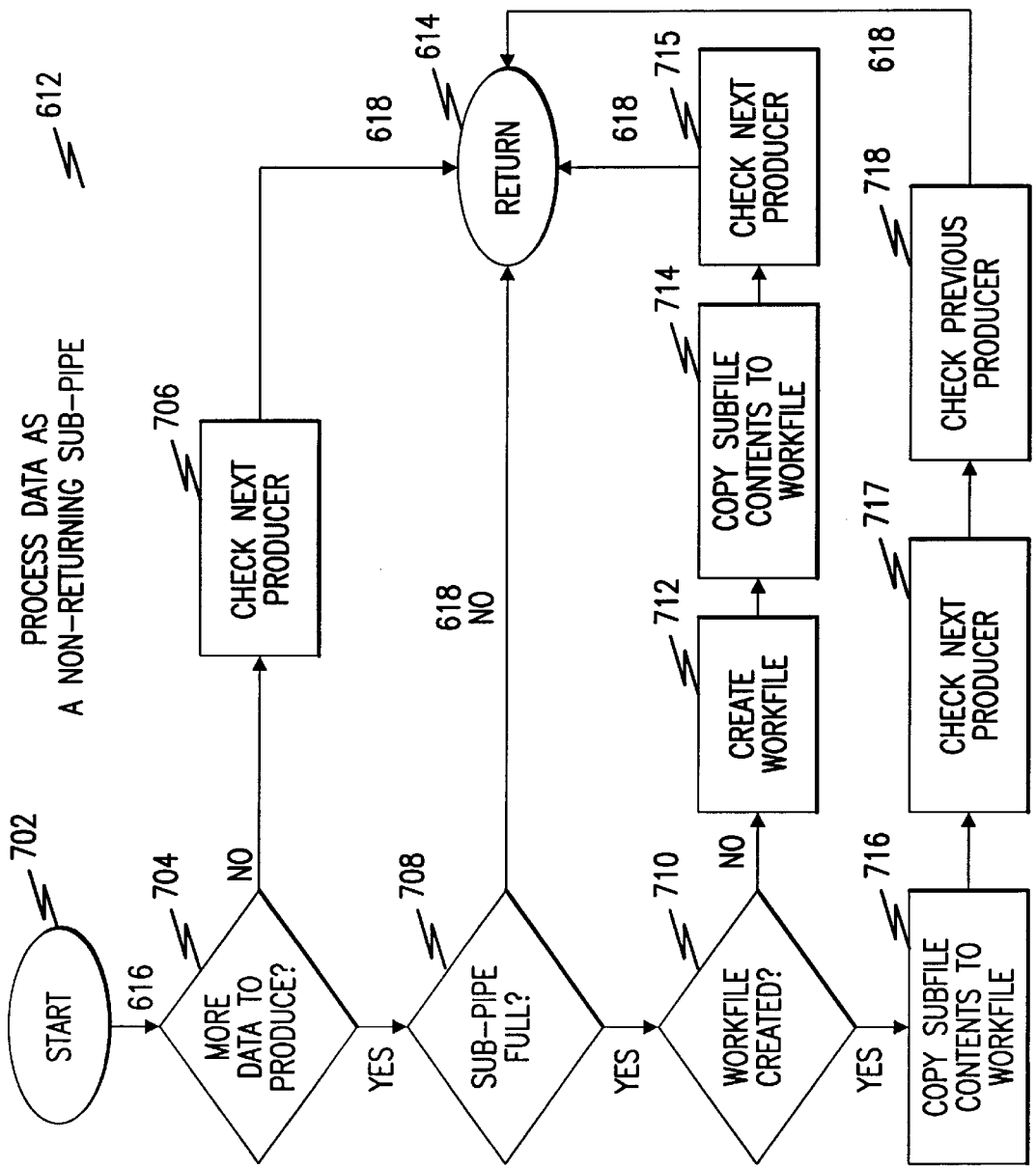
FIG. 7 is a control flow diagram representing the operation of a producer processing data as a non-returning sub-pipe.

Referring again to step 608, if the producer 210a–210n determines that it is not the returning sub-pipe, the producer 210a–210n proceeds to step 612. Step 612 is illustrated in FIG. 7. Upon executing step 612, the producer 210a–210n enters step 704. In step 704, the producer 210a–210n determines whether there is more data to produce.

In step 704, if there is no more data to produce, the producer 210a–210n proceeds to step 706. In step 706, the producer 210a–210n makes a pacing check on the next producer 210a–210n. Step 706 is identical to step 610, described above, and also described in greater detail below. Continuing from step 706, the producer 210a–210n proceeds to step 614 and exits.

Referring again to step 704, if the producer 210a–210n determines that it has more data to produce, it proceeds to step 708. In step 708, the producer 210a–210n determines whether its associated sub-pipe 208a–208n is full. If the sub-pipe 208a–208n is not full, the producer 210a–210n proceeds to step 614 and exits. If the sub-pipe 208a–208n is full, the producer 210a–210n proceeds to step 710.

In step 710, the producer 210a–210n determines whether it has already created a workfile 204 for receiving data rows. If a workfile 204 has not been created the producer 210a–210n proceeds to step 712. In step 712, the producer 210a–210n creates the workfile 214. Continuing to step 714, the producer 210a–210n copies the contents of its sub-pipe 208a–208n to the workfile 204. Continuing to step 715, the producer 210a–210n makes a pacing check on the next producer 210a–210n. Step 715 is identical to step 610, described above, and also described in greater detail below. Continuing from step 715, the producer 210a–210n proceeds to step 614 and exits.

Referring again to step 710, if the producer 210a–210n determines that it has already created a workfile 204, the producer 210a–210n proceeds to step 716. In step 716, the producer 210a–210n copies the contents of its sub-pipe 208a–208n to the workfile 214. Continuing to step 717, the producer 210a–210n makes a pacing check on the next producer 210a–210n. Step 717 is identical to step 610, described above, and also described in greater detail below. Continuing from step 717, the producer 210a–210n proceeds to step 718. In step 718, the producer 210a–210n makes a pacing check on the previous producer 210a–210n. Step 718 is described in more detail below. Continuing from step 718, the producer 210a–210n proceeds to step 614 and exits.

In practice, a more complicated implementation occurs when the producer 210a–210n becomes the returning sub-pipe (or the current-producer) after it has already filled its associated sub-pipe 208a–208n and has been writing data rows to a workfile 214. As the returning sub-pipe writing to a workfile 214, the current-producer immediately suspends itself to allow the consumer 204 time to consume the produced data rows in the workfile 214. The current-producer makes this check to suspend itself after step 608 and before step 610 on FIG. 6. Once the consumer 204 consumes the data rows from the workfile 214, the consumer 204 resumes the current-producer.

From this point, as the returning sub-pipe, the current-producer only writes data rows to its associated sub-pipe 208a–208n and will not spill over to a workfile 214. If the current-producer fills its sub-pipe 208a–208n, the current-producer once again suspends itself and waits for the consumer 204 to resume it.

Figure 8:
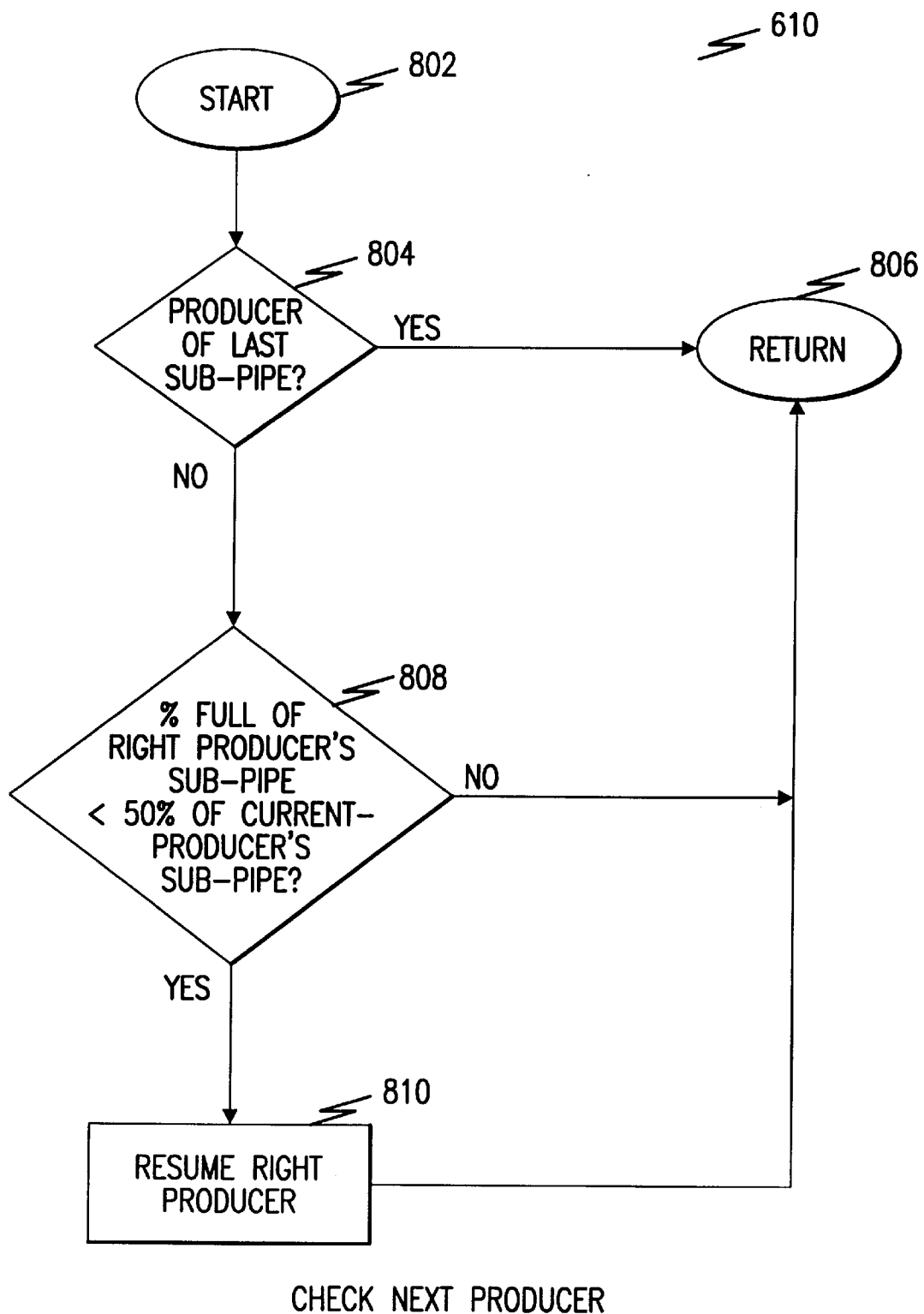
FIG. 8 is a control flow diagram representing the operation of a producer checking the next producer.

The control flow of step 610, checking the next producer 210a–210n, is illustrated in FIG. 8. Upon entering step 610, a producer 210a–210n enters step 804. In step 804, the producer 210a–210n determines whether it is the producer 210a–210n of the last sub-pipe 208a–208n, or rather, the last producer 210a–210n of the producer order. If the producer 210a–210n determines that it is the last producer 210a–210n, the producer 210a–210n proceeds to step 806 and exits because there is not a next producer 210a–210n to check.

If, in step 804, the producer 210a–210n determines that it is not the producer 210a–210n of the last sub-pipe 208a–208n, the producer 210a–210n proceeds to step 808. In step 808, the producer 210a–210n determines whether the percent full of the next producer's 210a–210n sub-pipe 208a–208n is less than a floor threshold percentage of the producer's 210a–210n sub-pipe 208a–208n. The chosen embodiment of the present invention implements a floor threshold value of fifty (50) percent. It would be readily apparent to a person of ordinary skill in the relevant art to use a different floor threshold.

If, in step 808, the producer 210a–210n determines that the next producer 210a–210n is not less than the floor threshold, the producer 210a–210n proceeds to step 806 and exits. If, however, the producer 210a–210n determines that the next producer 210a–210n is less than the floor threshold, the producer 210a–210n proceeds to step 810. In step 810, the producer 210a–210n resumes the next producer 210a–210n if the next producer 210a–210n had suspended itself. The producer 210a–210n continues from step 810 to step 806 and exits.

Figure 9:
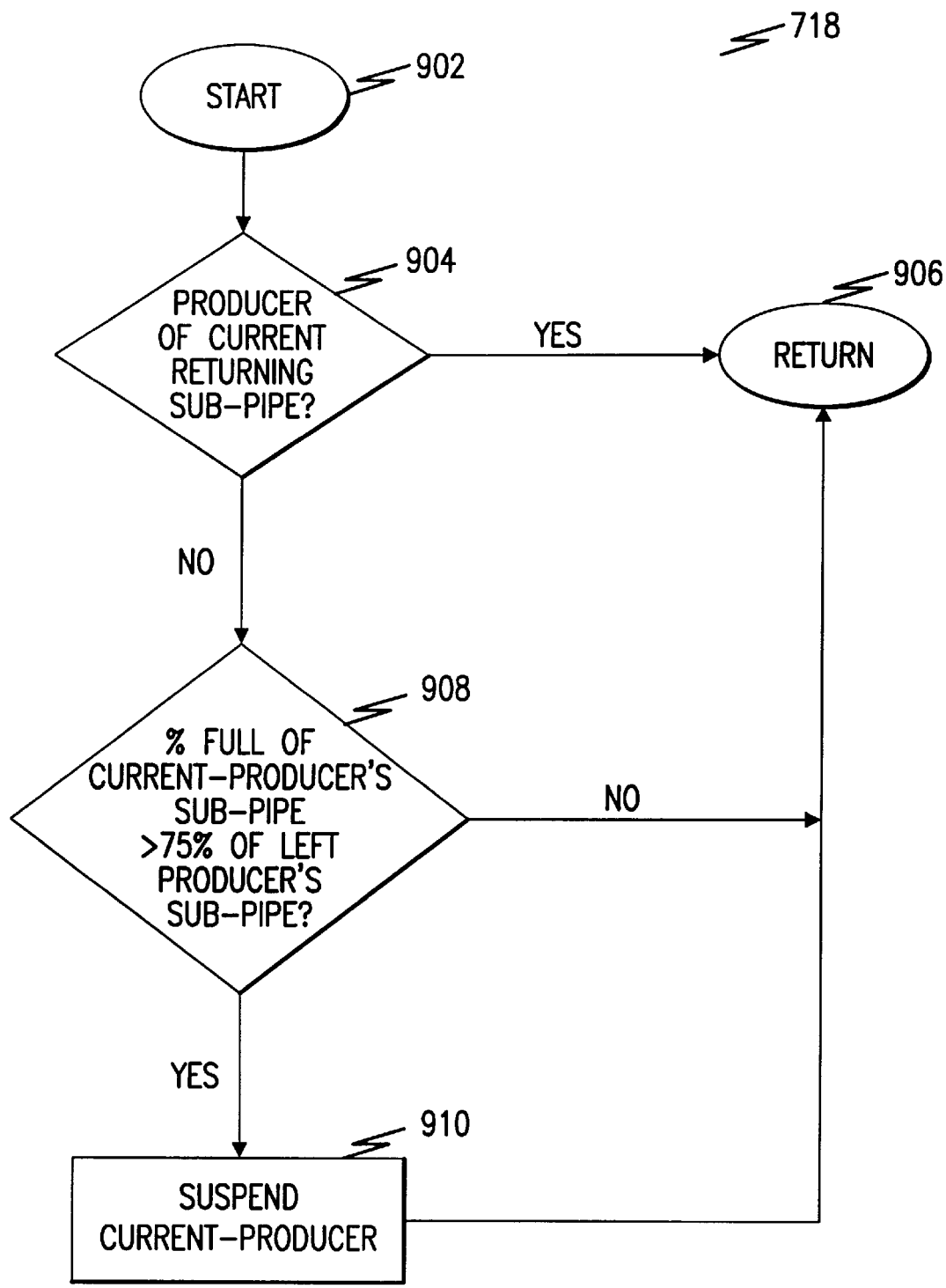
FIG. 9 is a control flow diagram representing the operation of a producer checking the previous producer.

The control flow of step 718, checking the previous producer 210a–210n, is illustrated in FIG. 9. Upon entering step 718, a producer 210a–210n enters step 904. In step 904, the producer 210a–210n determines whether it is the producer 210a–210n of the current returning sub-pipe. If the producer 210a–210n determines that it is the current returning sub-pipe, the producer 210a–210n proceeds to step 906 and exits because there is not a previous producer 210a–210n to check.

If, in step 904, the producer 210a–210n determines that it is not the producer 210a–210n of the current returning sub-pipe, the producer 210a–210n proceeds to step 908. In step 908, the producer 210a–210n determines whether the percent full of it's sub-pipe 208a–208n is greater than a ceiling threshold percentage of the previous producer's 210a–210n sub-pipe 208a–208n. The chosen embodiment of the present invention implements a ceiling threshold value of seventy-five (75) percent. It would be readily apparent to a person of ordinary skill in the relevant art to use a different ceiling threshold.

If, in step 908, the producer 210a–210n determines that its sub-pipe 208a–208n is not greater than the ceiling threshold, the producer 210a–210n proceeds to step 906 and exits. If, however, the producer 210a–210n determines that its sub-pipe 208a–208n is greater than the ceiling threshold, the producer 210a–210n proceeds to step 910. In step 910, the producer 210a–210n suspends itself, thereby freeing up system resources for the previous producer 210a–210n to complete its processing. The producer 210a–210n continues from step 910 to step 906 and exits.

Conclusion

While various embodiments of the present invention have been described above, it should be understood that they have been presented by the way of example only, and not limitation. If it will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

Having thus described our invention, what we claim as new and desire to secure by Letters Patent is:

1. A computer-based system, comprising:
   a plurality of producers that are each assigned a task, wherein each of said producers utilize system resources to perform its assigned task and thereby generate result data and, wherein said plurality of producers perform said assigned tasks in parallel;
   a consumer to consume said data from each of said plurality of producers, wherein said consumer requires said data in natural order; and pacing means in each of said producers for pacing utilization of said system resources between said producers,
wherein said pacing means in each of said producers comprises a checking means for comparing its completion status against its previous producer and its next producer, and wherein based on comparisons performed by said checking means each of said producers determines whether to suspend utilizing system resources and determines whether to cause its said next producer to resume utilizing system resources, thereby ensuring that each of said producers does not perform unneeded advanced processing, that each of said producers' said next producer does not fall substantially behind each of said producers in generating said data, and that said plurality of producers complete said tasks in said natural order.

2. The computer-based system according to claim 1, further comprising a pipe including a plurality of sub-pipes, wherein each producer is associated with a sub-pipe and writes said data to said sub-pipe in said natural order, and said consumer consumes said data from said sub-pipes in natural order.

3. The computer-based system according to claim 2, further comprising a workfile, wherein said each producer writes said data in natural order to said workfile when said sub-pipe becomes full.

4. A computer-based system according to claim 3, wherein said consumer consumes said data from said workfile when said each producer writes said data to said workfile.

5. The computer-based system according to claim 2, said pacing means in said each producer comprising:
   a first determining means for determining whether said data generated by said each producer is currently being consumed by said consumer;
   a second determining means for determining whether said sub-pipe associated with said each producer is full;
   a suspending means for suspending said each producer if said first determining means determines that said data generated by said each producer is currently being consumed by said consumer and said second determining means determines that said sub-pipe associated with said each producer is full; and
   a resuming means for resuming said each producer when said suspending means suspends said each producer, wherein said consumer executes said resuming means after said consumer consumes said data in said sub-pipe associated with said each producer.

6. A computer-based system, comprising:
   a plurality of producers that are each assigned a task, wherein each of said producers utilize system resources to perform its assigned task and thereby generate result data and, wherein said plurality of producers perform said assigned tasks in parallel;
   a consumer to consume said data from each of said plurality of producers, wherein said consumer requires said data in natural order;
   pacing means in each of said producers for pacing utilization of said system resources between said producers thereby ensuring that said producers complete said tasks in said natural order;
   a pipe including a plurality of sub-pipes, wherein each producer is associated with a sub-pipe and writes said data to said sub-pipe, and said consumer consumes said data from said sub-pipes in natural order;
   a first checking means for checking a next producer's sub-pipe, wherein said first checking means compares a percentage full of said next producer's sub-pipe to a floor threshold percentage of said each producer's sub-pipe, wherein if said percentage full of said next producer's sub-pipe is less than said floor threshold percentage of said each producer's sub-pipe, then said each producer resumes said next producer; and
   a second checking means for checking a previous producer's sub-pipe, wherein said second checking means compares a percentage full of said each producer's sub-pipe to a ceiling threshold percentage of said previous producer's sub-pipe, wherein if said percentage full of said each producer's sub-pipe is greater than said ceiling threshold percentage of said previous producer's sub-pipe, then said each producer suspends itself;
   wherein said first checking means is not executed by said each producer if said each producer is a producer associated with a last sub-pipe, and said second checking means is not executed by said each producer if said each producer is associated with a returning sub-pipe.

7. The computer-based system according to claim 6, further comprising a workfile, wherein said each producer writes said data in natural order to said workfile when said sub-pipe becomes full.

8. A computer-based system according to claim 6, wherein said consumer consumes said data from said workfile when said each producer writes said data to said workfile.

9. A computer-based system, comprising:
   a plurality of producers that are each assigned a task, wherein each said producer utilizes system resources to perform its assigned task and thereby generate result data and, wherein said plurality of producers perform said assigned tasks in parallel; and
   pacing means in each producer for pacing utilization of system resources between said producers, wherein said pacing means in each said producer comprises a checking means for comparing its completion status against its previous producer and its next producer, and wherein based on comparisons performed by said checking means each said producer determines whether to suspend utilizing system resources and determines whether to cause its said next producer to resume utilizing system resources, thereby ensuring that each said producer does not perform unneeded advanced processing, that each said producer's said next producer does not fall substantially behind each said producer in generating said data, and that said plurality of producers complete said tasks in said natural order.

10. A computer-based system, comprising:
    a plurality of producers that are each assigned a task, wherein each of said producers utilize system resources to perform its assigned task and thereby produce result data and, wherein said plurality of producers perform said assigned tasks in parallel;
    pacing means in each producer for pacing utilization of system resources between said producers thereby ensuring that said producers complete said tasks in natural order;
    a sub-pipe for storing said data;
    said pacing means including:
       a first checking means for checking a next producer, wherein said first checking means compares a percentage full of said next producer's sub-pipe to a floor threshold percentage of said each producer's sub-pipe, wherein if said percentage full of said next producer's sub-pipe is less than said floor threshold percentage of said each producer's sub-pipe, then said each producer resumes said next producer; and a second checking means for checking a previous producer, wherein said second checking means compares a percentage full of said each producer's sub-pipe to a ceiling threshold percentage of said previous producer's sub-pipe, wherein if said percentage full of said each producer's sub-pipe is greater than said ceiling threshold percentage of said previous producer's sub-pipe, then said each producer suspends itself;

wherein said first checking means is not executed by said each producer if said each producer is a producer associated with a last sub-pipe, and said second checking means is not executed by said each producer if said each producer is associated with a returning sub-pipe.

11. The computer-based system according to claim 10, said pacing means in said each producer comprising:

a first determining means for determining whether said data generated by said each producer is currently being consumed by said consumer;

a second determining means for determining whether said sub-pipe associated with said each producer is full;

a suspending means for suspending said each producer if said first determining means determines that said data generated by said each producer is currently being consumed by a consumer and said second determining means determines that said sub-pipe associated with said each producer is full; and a resuming means for resuming said each producer when said suspending means suspends said each producer, wherein said consumer executes said resuming means after said consumer consumes said data in said sub-pipe associated with said each producer.

12. In a system including a plurality of producers that are each assigned a task, wherein each of said producers utilize system resources to perform its assigned task and thereby produce result data and, wherein said plurality of producers perform said assigned tasks in parallel, a method in a producer for ensuring that said producer does not complete its task prior to a previous producer, comprising:

1) determining if result data generated by said producer is currently being consumed by a consumer;

2) if it is determined in step (1) that said data generated by said producer is not being currently consumed by said consumer, then comparing a percentage complete of said producer to a ceiling threshold percentage complete of said previous producer; and 3) suspending said producer, if it is determined in step (1) that said data generated by said producer is not being currently consumed by said consumer and it is determined in step (2) that said percentage complete of said producer is greater than said ceiling threshold percentage complete of said previous producer.

13. The method of step 12, further comprising:

4) determining if said producer is a last producer;

5) if said producer is not a last producer, then comparing a percentage complete of a next producer to a floor threshold percentage complete of said producer; and 6) resuming said next producer, if it is determined in step (4) that said producer is not a last producer, and it is determined in step (5) that said percentage complete of said next producer is less than said floor threshold percentage complete of said producer.

14. The method of step 13, further comprising:

7) writing said data to a sub-pipe.

15. The method of step 14, further comprising:

8) writing said data to a workfile if said sub-pipe becomes full.

16. The method of step 14, further comprising:

8) determining whether said sub-pipe associated with said producer is full;

9) suspending said producer if it is determined in step (1) that said data generated by said producer is currently being consumed by said consumer, and it is determined in step (8) that said sub-pipe associated with said producer is full; and 10) resuming said producer upon suspension of said producer in step (9), wherein said consumer resumes said producer after said consumer consumes said data in said sub-pipe associated with said producer.

17. A computer program product for use with a computer system, comprising:

a computer usable medium having computer readable program code means embodied in said medium for a plurality of producers to produce result data, wherein each of said plurality of producers utilize system resources to perform an assigned task and thereby generate said result data and, wherein said plurality of producers perform said assigned tasks in parallel, said computer program product having:

computer readable program code pacing means in each producer for pacing utilization of system resources between said producers, wherein said computer readable program code pacing means in each said producer comprises a checking means for comparing its completion status against its previous producer and its next producer, and wherein based on comparisons performed by said checking means each said producer determines whether to suspend utilizing system resources and determines whether to cause its said next producer to resume utilizing system resources, thereby ensuring that each said producer does not perform unneeded advanced processing, that each said producer's said next producer does not fall substantially behind each said producer in generating said data, and that said plurality of producers complete said tasks in natural order.

18. A computer program product for use with a computer system, comprising:

a computer usable medium having computer readable program code means embodied in said medium for a plurality of producers to produce result data, wherein each of said producers utilize system resources to perform an assigned task and thereby produce said data and, wherein said plurality of producers perform said assigned tasks in parallel, said computer program product having:

computer readable program code pacing means in each producer for pacing utilization of system resources between said producers thereby ensuring that said producers complete said tasks in said natural order;

said computer readable program code pacing means in said each producer including:

a sub-pipe for storing said data;

a first checking means for checking a next producer, wherein said first checking means compares a percentage full of said next producer's sub-pipe to a floor threshold percentage of said each producer's sub-pipe, wherein if said percentage full of said next producer's sub-pipe is less than said floor threshold percentage of said each producer's sub-pipe, then said each producer resumes said next producer; and a second checking means for checking a previous producer, wherein said second checking means compares a percentage full of said each producer's sub-pipe to a ceiling threshold percentage of said previous producer's sub-pipe, wherein if said percentage full of said each producer's sub-pipe is greater than said ceiling threshold percentage of said previous producer's sub-pipe, then said each producer suspends itself;

wherein said first checking means is not executed by said each producer if said each producer is a producer associated with a last sub-pipe, and said second checking means is not executed by said each producer if said each producer is associated with a returning sub-pipe.

19. The computer program product according to claim 18, said computer readable program code pacing means in said each producer comprising:

a first determining means for determining whether said data generated by said each producer is currently being consumed by said consumer;

a second determining means for determining whether said sub-pipe associated with said each producer is full;

a suspending means for suspending said each producer if said first determining means determines that said data generated by said each producer is currently being consumed by a consumer and said second determining means determines that said sub-pipe associated with said each producer is full; and a resuming means for resuming said each producer when said suspending means suspends said each producer, wherein said consumer executes said resuming means after said consumer consumes said data in said sub-pipe associated with said each producer.

20. A program storage device readable by a machine, tangibly embodying a program of instructions executable by the machine to perform method steps for ensuring that a producer does not complete its task prior to a previous producer, the method including the following steps:

1) determining if result data generated by said producer is currently being consumed by a consumer;

2) if it is determined in step (1) that said data generated by said producer is not being currently consumed by said consumer, then comparing a percentage complete of said producer to a ceiling threshold percentage complete of said previous producer; and 3) suspending said producer, if it is determined in step (1) that said data generated by said producer is not being currently consumed by said consumer, and it is determined in step (2) that said percentage complete of said producer is greater than said ceiling threshold percentage complete of said previous producer.

21. The program storage device of step 20, further comprising the following steps:

4) determining if said producer is a last producer;

5) if said producer is not a last producer, then comparing a percentage complete of a next producer to a floor threshold percentage complete of said producer; and 6) resuming said next producer, if it is determined in step (4) that said producer is not a last producer, and it is determined in step (5) that said percentage complete of said next producer is less than said floor threshold percentage complete of said producer.

22. The program storage device of step 21, further comprising the following step:

7) writing said data to a sub-pipe.

23. The program storage device of step 22, further comprising the following step:

8) writing said data to a workfile if said sub-pipe becomes full.

24. The program storage device of step 22, further comprising the following steps:

8) determining whether said sub-pipe associated with said producer is full;

9) suspending said producer if it is determined in step (1) that said data generated by said producer is currently being consumed by said consumer, and it is determined in step (8) that said sub-pipe associated with said producer is full; and 10) resuming said producer upon suspension of said producer in step (9), wherein said consumer resumes said producer after said consumer consumes said data in said sub-pipe associated with said producer.

* * * * *